Aug. 1, 1967

R. W. PETERS 3,334,255

ELECTRIC MOTOR

Filed Feb. 19, 1965

INVENTOR.
ROBERT W. PETERS
BY
Wheeler, Wheeler & Wheeler
ATTORNEYS

United States Patent Office 3,334,255
Patented Aug. 1, 1967

3,334,255
ELECTRIC MOTOR
Robert W. Peters, W. 160 N. 6338 Claremore Circle,
Menomonee Falls, Wis. 53051
Filed Feb. 19, 1965, Ser. No. 433,965
16 Claims. (Cl. 310—215)

The invention relates generally to dynamo-electric machines such as electric motors and generators. More particularly, the invention relates to stators and like structures having a central bore and a series of radially outwardly extending slots in which wire coils are laid. The invention has particular application to lap wound stators and the like but is also usable in motors having other winding arrangements.

The invention provides an inexpensively fabricated insulating member or insert which is adapted for insertion in a stator slot and which, in combination with the stator, serves to facilitate coil winding and particularly lap winding in stator coils. In addition, the insert serves to prevent loss or escape of the winding coils from the slot. Basically, the insert comprises a base portion adapted to be seated or engaged against the radially outwardly located slot bottom, arms which respectively extend from the ends of the base and are adapted to be seated or engaged against the slot sides, and one or more end portions which respectively extend from the ends of the arms and which are preferably curved and project across the slot opening to afford retention in the insert of the wires laid in the slot. The end portion is resiliently flexible to afford displacement during the wire laying operation and to prevent subsequent wire escape.

In two disclosed embodiments of the invention, the insert also integrally includes a partition which divides the insert-lined slot into two cavities or cells and which preferably includes an enlarged head. The head serves to assist in closing the slot opening against the loss therefrom of wire coils and to provide a means for selectively guiding laying of the wire into the two cells in accordance with the direction of travel of the wire laying needle.

Use of the inserts disclosed herein affords automatic machine winding of lap wound stators without machine downtime for the insertion of insulation between two separate windings in any give slot. Use of the inserts disclosed herein also avoids the previous practice of using a separate slot closing member as the insert disclosed herein serves both to readily afford wire deposit within the slot and to subsequently prevent wire escape from the slot.

Other objects and advantages of the invention will become known by reference to the following description and the accompanying drawings.

Figure 1:
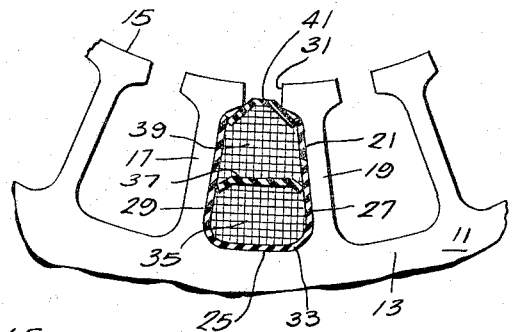
FIGURE 1 is a fragmentary view of an engine including a wound stator illustrating one form of prior construction.

Shown fragmentarily in FIGURE 1 is a portion of an engine 11 including a partially wound stator 13 having a surface defining an internal bore 15 and means including two teeth 17 and 19 defining a slot 21 for receiving a winding. The slot 21 includes a radially outwardly located base or bottom 25 and a pair of sides 27 and 29. The teeth 17 and 19 are enlarged at the radially inner ends to define a slot opening 31 of lesser space than the space between the sides 27 and 29.

In motor construction, and particularly in the construction of lap wound motors, one past conventional practice included initially inserting into the slot 21 a U-shaped element or sleeve 33 of insulating material, subsequently laying a first or radially outermost winding 35 in the sleeve 33 then inserting a dividing or insulating member 37, then laying a second or radially inwardly located winding 39 in the sleeve 33, and finally, closing the slot 21 with a closure or member 41 of insulating material.

In accordance with the invention, stator windings in general, and lap windings in particular, are facilitated by the use of a preformed insert which eliminates the use of a separate closure, such as the member 41, which, in some instances, eliminates the use of a separating member 37 to separate or insulate the windings 35 and 39 from each other, and which can take various forms.

Figure 2:
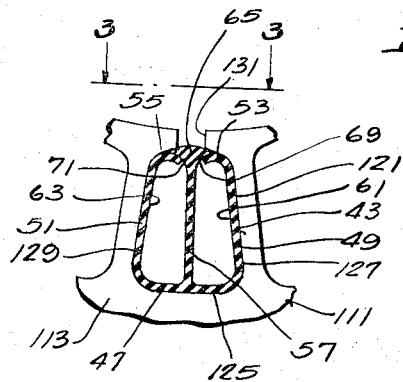
FIGURE 2 is a fragmentary view of an engine including a stator and insert combination embodying various of the features of the invention.
Figure 3:
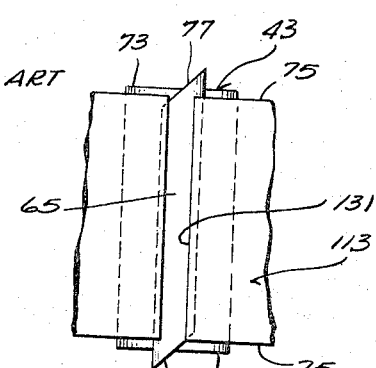
FIGURE 3 is a fragmentary view taken generally along line 3—3 of FIGURE 2.

In FIGURES 2 and 3, there is fragmentarily shown an engine 111 including a stator 113 including one or more inserts 43 formed of a plastic material which is a good electrical insulator, which has a smooth surface or texture, and which, in general, is resiliently flexible. Examples of such plastic material are the products sold under the trademarks "nylon" and "Mylar." Preferably, the inserts 43 are fabricated from an elongated, extruded member or strip 45, such as is shown in FIGURE 4, by slitting or cutting the strip 45 transversely of its length.

Figure 4:
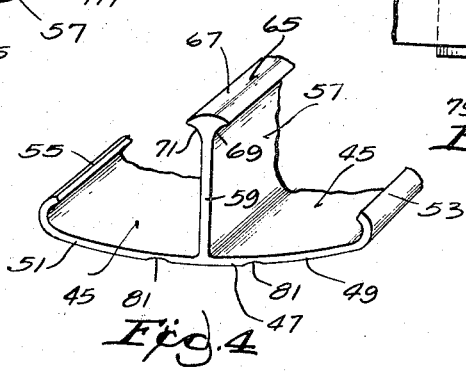
FIGURE 4 is a perspective view of an extruded plastic member or strip from which the insert in FIGURES 2 and 3 is fabricated.

As shown in FIGURES 2 and 4, the insert 43 includes a base or portion 47 which is adapted to engage the bottom 125 of the slot 121 and a pair of arms 49 and 51 which respectively extend from the ends of the base 47 and which are adapted to engage the sides 127 and 129 of the slot 121. Extending from the end of each of the arms are respective closures or end portions 53 and 55 which are preferably arcuately extending and which, in general, serve to bridge or close the slot opening 131, thereby preventing escape of any of the winding coils from the slot 121.

The end portions 53 and 55 preferably extend arcuately for at least about 90 degrees and cooperate with a divider, partition, or center member 57 to close off the slot opening 131. It is preferred that the end portions 53 and 55 be initially fabricated in arcuate form rather than relying on curvature upon insertion in the stator. When they are initially arcuately formed, the end portions have a greater degree of flexibility than if they were substantially flexed as a result of the insertion into the slot.

More particularly with respect to the center member 57, in the embodiment shown in FIGURES 2 and 4, the center member 57 is generally of T shape and includes a stem 59 which generally divides the insert into a pair of laterally related cavities or cells 61 and 63 and which extends generally perpendicularly from the base 47 and intermediate the arms 49 and 51. Also included in the center member 57, at the outer end thereof, is an enlarged head 65 having a convex outer surface 67 with a width greater than the slot opening 131. On its underside, the head 65 includes two convex undersurfaces 69 and 71 which respectively extend from the sides of the stem 59 and are engaged by the end or closure portions 53 and 55 projecting from the arms to thereby contain within the insert 43 the coils of the winding.

Preferably, as shown in FIGURE 3, the length of the insert 43 is greater than the width of the stator 113 so that the end margins 73 of the insert base and arms extend beyond the end faces 75 of the stator. In addition, the ends of the head 65 are preferably fabricated so as to provide means affording selective wire receipt into the cavities or cells 69 and 71, in accordance with the direction in which the wire is being laid. More particularly, as shown best in FIGURE 3, this means comprises head end edges 77 and 79, which edges 77 and 79 extend obliquely to the direction of the length of the insert. Preferably, the oblique edges 77 and 79 intersect the longitudinal center line of the dividing member 57 in the plane of the end edges 73 of the base and arms. When the oblique edges 77 and 79 are thusly cut during fabrication of the inserts 43 from the strip 45, there is no wasted material.

In use, before winding of the stator, the end portions 53 and 55 are engaged with the undersurfaces 69 and 71 of the head 65, and the insert 43 is slightly collapsed to facilitate insertion in the applicable slot. After insertion, the resiliency of the insert 43 engages the base 47 and and the arms 49 and 51 with the bottom 125 and sides 127 and 129 of the slot 121. Subsequently, during winding, winding head travel from the top to the bottom of the slot 131 (as shown in FIGURE 3) results in engagement of the winding head with the edge 77 and consequent resilient displacement of the head 65 to the right as shown in FIGURE 3, together with possible displacement of the end portion 55 to the left, thereby affording deposit of the wire in the cell 71. When the next winding is placed in the slot, the winding head will normally be traveling in the opposite direction and consequently, will displace the head 65 to the left as seen in FIGURE 3, together with possible displacement of the end portion 53 to the right, thereby affording wire deposit in the cell 69.

As seen in FIGURE 4, the strip 45 includes two necks or recesses 81 which extend lengthwise, which serve to delineate the base 47 from the arms 49 and 51, and which facilitate bending of the strip or insert into U-shaped forms. As shown in FIGURE 2, when the insert is in U shape, the folded condition of the arms 49 and 50 relative to the base 47 serves to swell the recesses 81 and to provide a more or less uniform wall thickness.

Figures 5, 6, 7:
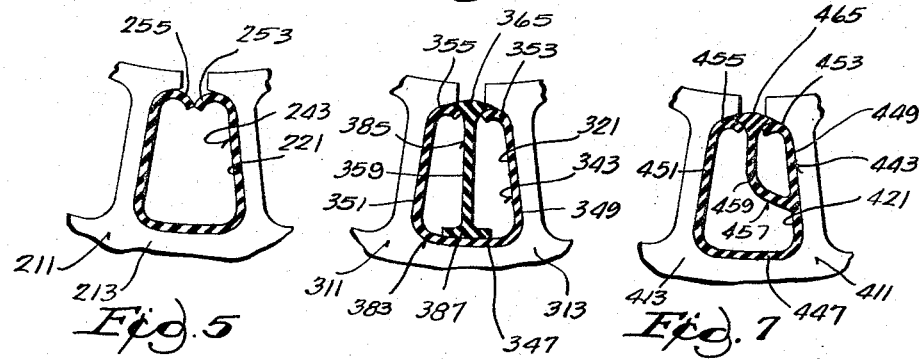
FIGURE 5 is a fragmentary view of another engine including a stator and insert combination embodying various of the features of the invention.
FIGURE 6 is a fragmentary view of another engine including a stator and insert combination embodying various of the features of the invention.
FIGURE 7 is a fragmentary view of still another engine including a stator and insert combination embodying various of the features of the invention.

Shown in FIGURE 5 is another embodiment of an engine 211 including a stator 213 having therein a slot 221 containing an insert 243. The insert 243 generally includes the features of the insert 43 except that the center partition or member has been omitted and that end portions 253 and 255 extend transversely across the slot 221 a greater distance and are adapted to engage one another so as to afford closure of the slot. The insert 243 is particularly adapted for use where a single winding is to be retained within the insert.

In FIGURE 6 there is shown another embodiment of an engine 311 including a stator 313 having therein a series of slots 321 which can be respectively lined with an insert assembly 343. The insert assembly 343 combines generally the features of the inserts 43 and 243 shown in FIGURES 3 and 5. Specifically, in FIGURE 6, the insert assembly 343 is a two-part insert including a first part 383 having a base 347, arms 349 and 351, and arcuate end portions 353 and 355. The second part 385 comprises a partition member having a footing 387 adapted to engage the base 347, a stem 359 extending from the footing 387, and an enlarged head 365 constructed similarly to the head 65 of the insert 43. Lateral movement of the partititon member between the sides and the slot can be controlled, at least in part, by limiting movement of the footing 387 by reason of engagement of the side edges of the footing with the arms 349 and 351. The variation in the width of the footing 387 on each side of the stem 359 will vary the amount of permissible movement of the footing. In use, the insert assembly 343 functions in much the same manner as the insert 43.

At least a part of the advantages of the invention can be obtained when employing an insert assembly including a first part having a base and arms, such as the base 347 and arms 349 and 351, and a second part comprising a partition member extending between the arms 349 and 351. In FIGURE 7, there is shown an engine embodiment 411 including a stator 413 having a series of slots 421. Located in one of the slots 421 is an insert 443 which is particularly adapted for placement in the slot of two windings having an unequal number of coils. Specifically, the insert 443 comprises a base 447, a pair of arms 449 and 451, and end portions 453 and 455 constructed generally in accordance with the insert 43. In addition, the insert 443 includes a divider or member 457 which extends from a point intermediate the ends of the arm 449 and which includes a stem 459 and an enlarged head 465, which head is fabricated similarly to the head 65 of the insert 43. Winding operation with the insert 443 is generally similar to that described with respect to the insert 43.

Various of the features of the invention are set forth in the following claims.

What is claimed is:

1. A slot liner for a dynamo-electric machine, said liner being of resiliently flexible material and comprising a base portion, a pair of arms extending respectively from the ends of said base portion, and a curved portion extending from the free end of one of said arms, said curved portion extending through an arc of at least about ninety degrees.

2. A slot liner for a dynamo-electric machine, said liner being of resiliently flexible material and comprising a base portion, a pair of arms extending respectively from the ends of said base portion, end portions extending respectively from the free ends of each of said arms, and a center member extending intermediate said arms from said base portion.

3. A slot liner for a dynamo-electric machine, said liner being of resiliently flexible material and comprising a base portion, a pair of arms extending respectively from the ends of said base portion, and curved portions extending respectively from the free ends of each of said arms, said curved portions extending arcuately toward each other.

4. A slot liner for a dynamo-electric machine, said liner being of resiliently flexible material and comprising a base portion, a pair of arms extending respectively from the ends of said base portion, an end portion extending from the free end of one of said arms, and a partition portion extending toward said end portion from one of said base portion and arms.

5. A slot liner for a dynamo-electric machine, said liner being of resiliently flexible material and comprising a base portion, a pair of arms extending respectively from the ends of said base portion, an end portion extending from the free end of one of said arms, and a divider extending intermediate said arms from said base portion and having, at the outer end thereof, an enlarged head.

6. A slot liner for a dynamo-electric machine, said liner being of resiliently flexible material and comprising a base portion, a pair of arms extending respectively from the ends of said base portion, curved portions extending respectively from the free ends of each of said arms, said curved portions extending toward each other through an arc of at least ninety degrees, and a divider extending intermediate said arms from one of said base portion and said arms and having, at the outer end thereof, an enlarged head with concave undersurfaces respectively engageable by said curved portions.

7. A slot liner for a dynamo-electric machine, said liner being of resiliently flexible material and comprising a base portion, a pair of arms extending respectively from the ends of said base portion, curved portions extending respectively from the free ends of each of said arms, said curved portions extending arcuately toward each other, and a divider extending between said arms and having, at the outer end thereof, an enlarged head with concave undersurfaces respectively engageable by said curved portions.

8. A slot liner for a dynamo-electric machine, said liner being of resiliently flexible material comprising an elongated base portion, a pair of arms extending respectively from the ends of said base portion, an end portion extending from the free end of one of said arms, and a divider extending intermediate said arms and having, at the outer end thereof, an enlarged head with end margins terminating in angular relation to the direction of elongation of said base portion.

9. In a dynamo-electric machine, the combination comprising a stator including a central bore, and a series of slots extending radially outwardly from said central bore, each of said slots having a radially outwardly located bottom and a pair of sides extending from said bottom and defining, adjacent to said bore, a slot opening, an integral insulating member engaged along the sides and bottom of one of said slots and having an end portion extending across said opening, and a winding extending in said member.

10. In a dynamo-electric machine, the combination comprising a stator including a central bore and a series of slots extending radially outwardly from said central bore, each of said slots having a radially outwardly located bottom and a pair of sides extending from said bottom and defining, adjacent to said bore, a slot opening, an integral insulating member fabricated of resiliently flexible material and located in one of said slots, said member including a base portion engaged along the bottom of said one slot, a pair of arms extending respectively from the ends of said base portion and engaged along the sides of said one slot, and portions extending respectively from the free ends of said arms and across said slot opening, and a winding extending in said member.

11. In a dynamo electric machine, the combination comprising a stator including a central bore and a series of slots extending radially outwardly from said central bore, each of said slots having a radially outwardly located bottom and a pair of sides extending from said bottom and defining, adjacent to said bore, a slot opening, an integral insulating member located in one of said slots, said member including a base portion engaged along the bottom of said one slot, a pair of arms extending respectively from the ends of said base portion and engaged along the sides of said one slot, and an end portion extending from the free end of one of said arms and across said slot opening, and a divider extending intermediate said arms from said base portion and having, at the outer end thereof, an enlarged head, and respective windings in said members on each side of said divider.

12. In a dynamo electric machine, the combination comprising a stator including a central bore and a series of slots extending radially outwardly from said central bore, each of said slots having a radially outwardly located bottom and a pair of sides extending from said bottom and defining, adjacent to said bore, a slot opening, an integral insulating member located in one of said slots, said member including a base portion engaged along the bottom of said one slot, a pair of arms extending respectively from the ends of said base portion and engaged along the sides of said one slot, curved portions extending respectively from the free ends of said arms toward each other and across said opening, and a divider extending between said arms and having, at the outer end thereof, an enlarged head with concave undersurfaces respectively engageable by said curved portions, and a winding extending in said members.

13. In a dynamo electric machine, the combination comprising a stator including a central bore and a series of slots extending radially outwardly from said central bore, each of said slots having a radially outwardly located bottom and a pair of sides extending from said bottom and defining, adjacent to said bore, a slot opening, an integral insulating member located in one of said slots, said member including a base portion engaged along the bottom of said one slot, a pair of arms extending respectively from the ends of said base portion and engaged along the sides of said one slot, an end portion extending from the free end of one of said arms and across said opening, and a divider extending intermediate said arms and having, at the outer end thereof, an enlarged head with end margins terminating in angular relation to the direction of elongation of said base portion, and windings in said member on each side of said divider.

14 The combination of a stator comprising a central bore, and a series of slots extending radially outwardly from said central bore, each of said slots having a radially outwardly located bottom and a pair of sides extending from said bottom and defining, adjacent to said bore, a slot opening, an integral insulating member engaged along the sides and bottom of one of said slots and having an end portion extending across said opening, and a winding extending in said member.

15. In a dynamo-electric machine, the combination comprising a base, a pair of arms extending respectively from the ends of said base, and a partition member extending from said base intermediate said arms.

16. In a dynamo-electric machine, the combination comprising a stator including a central bore and a series of slots extending radially outwardly from said central bore, each of said slots having a riadially outwardly located bottom and a pair of sides extending from said bottom and defining, adjacent to said bore, a slot opening, and insulating means engaged along the sides and bottom of one of said slots and extending intermediate the sides of said slot.

No references cited.

MILTON O. HIRSHFIELD, *Primary Examiner.*

L. L. SMITH, *Assistant Examiner.*